(12) United States Patent
Lai et al.

(10) Patent No.: US 8,056,096 B2
(45) Date of Patent: Nov. 8, 2011

(54) OPTICAL DISC DRIVE

(75) Inventors: Ming-Ping Lai, Hsinchu (TW); Cheng-Chung Hsu, Hsinchu (TW)

(73) Assignee: Lite-On It Corporation, Taipei (TW)

( * ) Notice: Subject to any disclaimer, the term of this patent is extended or adjusted under 35 U.S.C. 154(b) by 203 days.

(21) Appl. No.: 12/642,874

(22) Filed: Dec. 21, 2009

(65) Prior Publication Data

US 2011/0099566 A1    Apr. 28, 2011

(30) Foreign Application Priority Data

Oct. 27, 2009 (CN) .......................... 2009 1 0206891

(51) Int. Cl.
*G11B 33/02* (2006.01)
(52) U.S. Cl. ....................................................... 720/647
(58) Field of Classification Search .................. 720/647, 720/646

See application file for complete search history.

(56) References Cited

U.S. PATENT DOCUMENTS

| | | | |
|---|---|---|---|
| 2,358,607 A * | 9/1944 | Tinnerman | 292/87 |
| 2,608,085 A * | 8/1952 | Castle | 70/169 |
| 4,673,100 A * | 6/1987 | Reis et al. | 220/324 |
| 4,730,731 A * | 3/1988 | Allison | 206/540 |
| 4,811,138 A * | 3/1989 | Park | 360/96.51 |
| 6,863,175 B2 * | 3/2005 | Gelardi | 206/1.5 |

* cited by examiner

*Primary Examiner* — David D Davis
(74) *Attorney, Agent, or Firm* — Jianq Chyun IP Office (57) ABSTRACT

An optical disc drive includes a main body, a cover, an extension, and an elastic element. The cover includes a pivoting portion and is pivotably connected to the main body via the pivoting portion. The extension is connected to the pivoting portion. The cover is adapted for pivoting relative to the main body to drive the extension to move along a movement path. The elastic element is disposed on the main body and includes two first limiting portions opposite to each other. The movement path extends through a gap between the two first limiting portions. A distance between the two first limiting portions is smaller than an outer diameter of the extension.

8 Claims, 7 Drawing Sheets

OPTICAL DISC DRIVE

CROSS-REFERENCE TO RELATED APPLICATION

This application claims the priority benefit of China application serial no. 200910206891.5, filed Oct. 27, 2009. The entirety of the above-mentioned patent application is hereby incorporated by reference herein and made a part of specification.

BACKGROUND OF THE INVENTION

1. Field of the Invention

The present invention relates to an optical disc drive, and more particularly, to a cover-type optical disc drive.

2. Description of Related Art

With the growing of computer technology, the amount of data that needs to be processed by computers has been significantly increased. The maturer the computer technology is, the more types of data the computers process and the larger amount of data we need to store. Due to the advantages of low price, ease of carrying, large storage, ease of conservation, long term conservation and high security of data against damage, optical discs have gradually replaced the traditional magnetic storage medium to become an indispensable optical storage medium. With the optical discs being widely used, optical disc drives used to reading data on the optical disc have became an indispensable electronics product.

As far as the cover-type optical disc drive is concerned, it includes a main body for accommodating the optical disc and a cover pivotably connected to the main body. In order to prevent the user from opening the cover to cause a dangerous situation when the optical disk is rotating at a high speed or has not been completely stopped, the cover-type optical disc drive may be equipped with an optical disc braking mechanism which causes the disc speed to decrease rapidly, for example, by using friction. In addition, the cover-type optical disc drive may be structurally configured to achieve multi-stage opening of the cover, such that the cover can be fully opened only when the user exerts a small force on the cover as the cover has been opened to a particular angle. In this way, the optical disc drive can be given a sufficient time to decrease the disc speed.

SUMMARY OF THE INVENTION

Accordingly, the present invention is directed to an optical disc drive which can achieve multi-stage opening of the cover with simple structures.

The present invention provides an optical disc drive which includes a main body, a cover, an extension, and an elastic element. The main body is suitable for accommodating an optical disc. The cover includes at least one pivoting portion and is pivotably connected to the main body via the pivoting portion. The extension is connected to the pivoting portion. The cover is adapted for pivoting relative to the main body to drive the extension to move along a movement path. The elastic element is disposed on the main body and includes two first limiting portions opposite to each other. The movement path extends through a gap between the two first limiting portions. A distance between the two first limiting portions is smaller than an outer diameter of the extension.

According to one embodiment of the present invention, the elastic element is a spring wire.

According to one embodiment of the present invention, the elastic element is a spring plate.

According to one embodiment of the present invention, the extension is substantially a cylinder.

According to one embodiment of the present invention, the elastic element further includes two second limiting portions opposite to each other, and the movement path extends through a gap between the two second limiting portions. A distance between the two second limiting portions is smaller than the outer diameter of the extension.

According to one embodiment of the present invention, the optical disc drive further includes a locking member and a torsion spring. The locking member is connected to the cover. The cover and the main body are interlocked with each other via the locking member when the cover is closed on the main body. The torsion spring is connected between the cover and the main body. The cover pivots relative to the main body away from the main body under the influence of the elastic force of the torsion spring when the interlocking between the cover and main body is removed.

In view of the foregoing, the elastic element of the present invention is fixed to the main body and the extension is connected to the cover. During pivoting of the cover relative to the main body toward the open position, the limiting portions of the elastic element interferences with the extension thus making the cover stay at a particular position. At this time, the user exerts a force to drive the extension to push the limiting portions apart against the elastic force of the elastic element, such that the cover can continue to pivot relative to the main body to be fully opened. In this way, the time for fully opening the cover can be extended, which provides a sufficient time for the optical disc in the main body to reduce the rotating speed. As such, the safety in using the optical disc drive can be increased. In addition, both the extension and elastic element are easy to fabricate and assemble, thus reducing fabrication cost and time.

In order to make the aforementioned and other features and advantages of the present invention more comprehensible, embodiments accompanied with figures are described in detail below.

DESCRIPTION OF THE EMBODIMENTS

Figure 1:
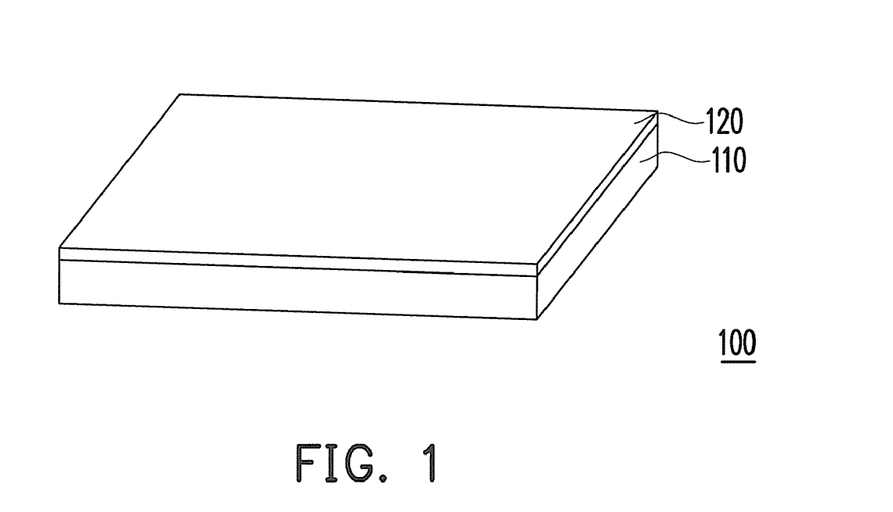
FIG. 1 is a perspective view of an optical disc drive according to one embodiment of the present invention.
Figure 2:
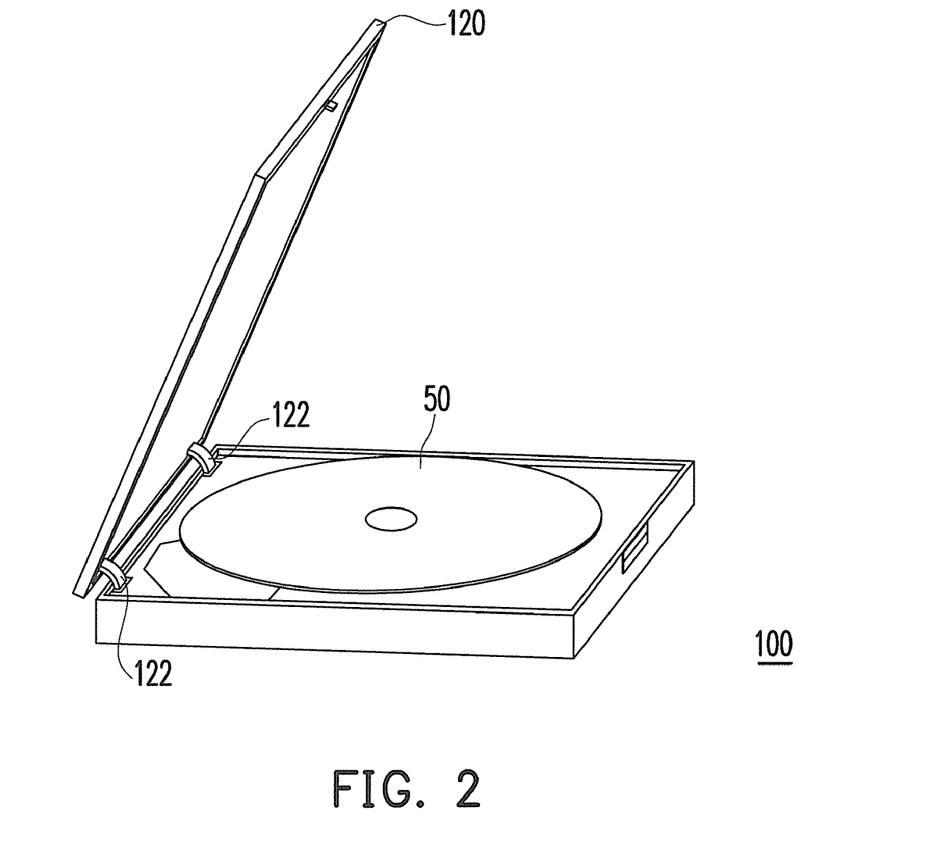
FIG. 2 is a perspective view of the optical disc drive of FIG. 1 with the cover being fully opened.

FIG. 1 is a perspective view of an optical disc drive according to one embodiment of the present invention. FIG. 2 is a perspective view of the optical disc drive of FIG. 1 with the cover being fully opened. Referring to FIGS. 1 and 2, the optical disc drive 100 of the present embodiment includes a main body 110 and a cover 120. The main body 110 is suitable for accommodating an optical disc 50 for data retrieving or storing. The cover 120 includes at least one pivoting portion 122 (two pivoting portions 122 are illustrated in the drawings) via which the cover 120 is pivotably connected to the main body 110. The cover 120 is suitable for pivoting relative to the main body 110 so as to be opened away from or closed to the main body 110.

Figure 3:
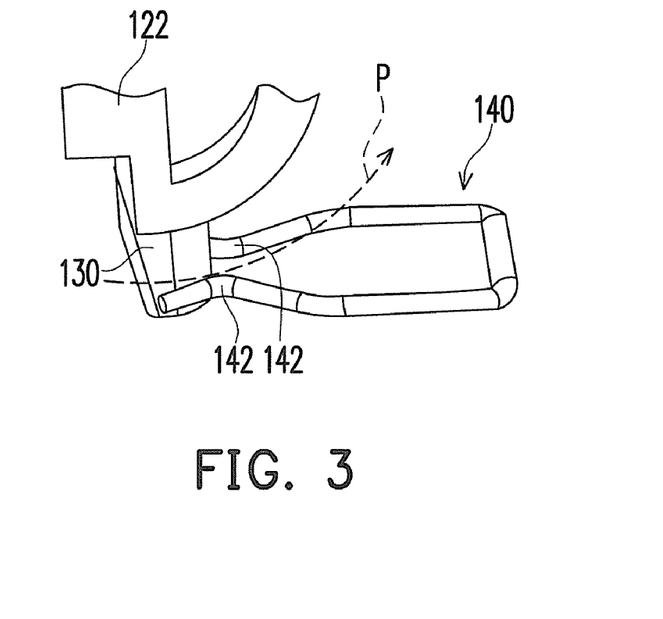
FIG. 3 is a partial perspective view of the optical disc drive of FIG. 1.

FIG. 3 is a partial perspective view of the optical disc drive of FIG. 1. Referring also to FIG. 3, the optical disc drive 100 further includes an extension 130 and an elastic element 140. It is noted that the structure depicted in FIG. 3 is hided within the main body 110 of FIG. 2 and thus is invisible. The extension 130 is connected to the pivoting portion 122. The cover 120, when pivoting relative to the main body 110, drives the extension 130 to move along a movement path P. The elastic element 140 is fixed to the main body 110 and has two limiting portions 142 opposite to each other. The movement path P extends through a gap between the two limiting portions 142.

Figure 4:
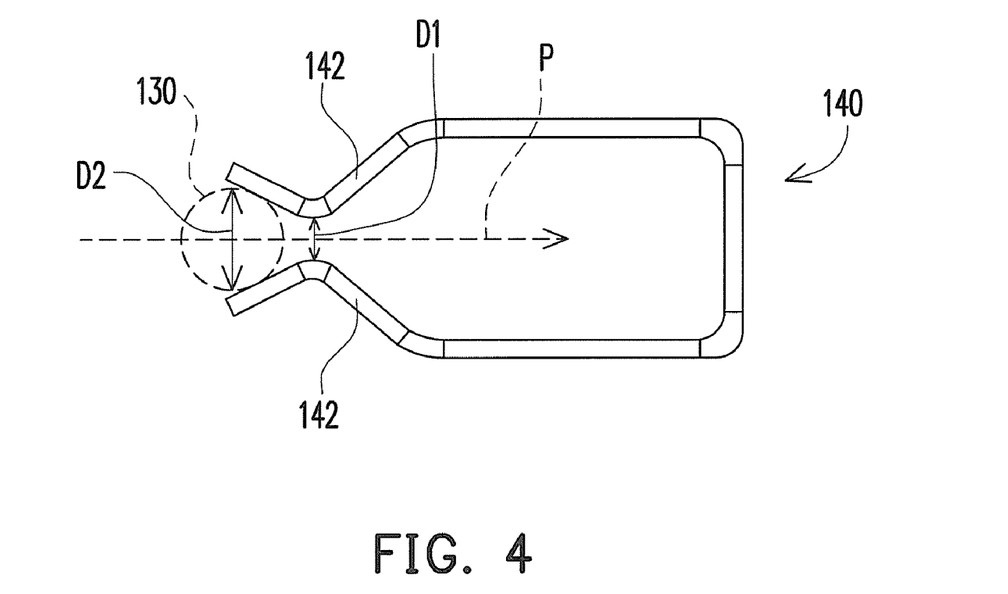
FIG. 4 is a top view of the elastic element of FIG. 3.

FIG. 4 is a top view of the elastic element of FIG. 3. Referring to FIGS. 1 and 4, in the present embodiment, a distance D1 between the two limiting portions 142 is smaller than an outer diameter D2 of the extension 130. As such, when the extension 130 is driven to reach the limiting portions 142 as the cover 120 pivots relative to the main body 110, the extension 130 is stopped by the limiting portions 142 thus preventing the cover 120 from further pivoting. At this movement, the user must manually operate the cover 120 such that the extension 130 passes the limiting portions 132 from therebetween by pushing the limiting portions 142 apart against the elastic force of the elastic element 140. As such, the cover 120 can continue pivoting relative to the main body 110 to be fully opened. A more detailed description is made below with reference to FIGS. 1, 3, 6, and 5A to 5C.

Figure 5A:
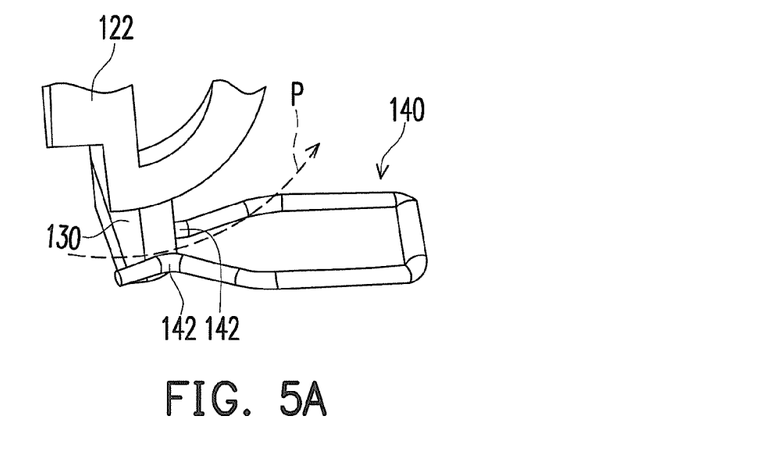
FIGS. 5A to 5C are operational views illustrating the movement of the extension of FIG. 3 along the movement path.
Figure 6:
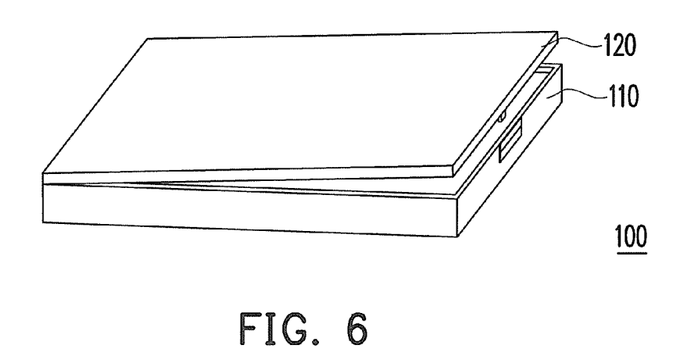
FIG. 6 is a perspective view of the optical disc drive of FIG. 1 with the cover being partially opened.

FIGS. 5A to 5C are operational views illustrating the movement of the extension of FIG. 3 along the movement path. FIG. 6 is a perspective view of the optical disc drive of FIG. 1 with the cover being partially opened. As shown in FIG. 1, when the cover 120 is closed on the main body 110, the extension 130 is in the position as shown in FIG. 3. When the user wants to open the cover 120, the cover 120 can pivot relative to the main body 110 to drive the extension 130 to reach the position as shown in FIG. 5A where the extension 130 contacts the limiting portions 142. At this time, the extension 130 is stopped by the limiting portions 142 from further movement and therefore the cover 120 stops pivoting and stays at the position as shown in FIG. 6.

Figure 5B:
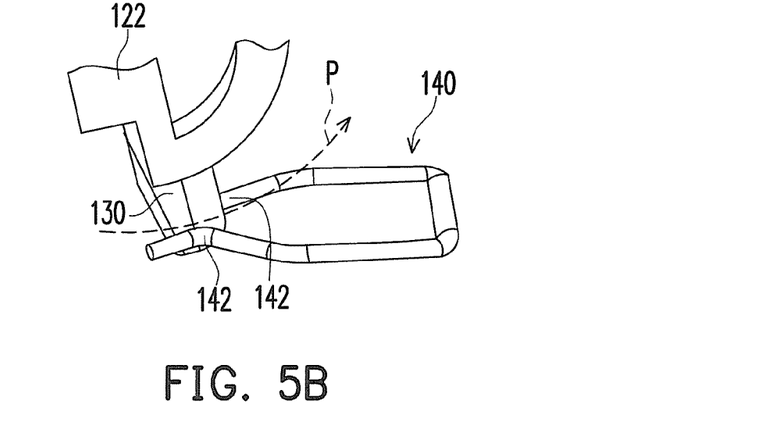
Figure 5C:
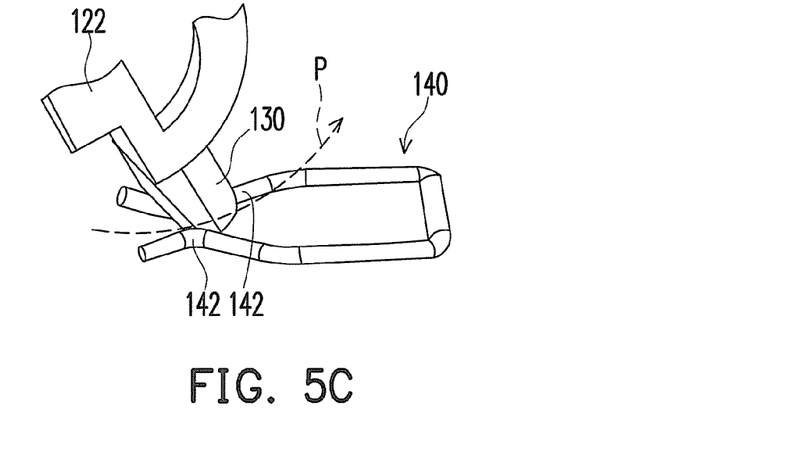

Then, the user may manually operate the cover 120 to drive the extension 130 of FIG. 5A to continue to move along the movement path P against the elastic force of the elastic element 140, thereby pushing the limiting portions 142 apart as shown in FIG. 5B. At this time, the distance between the limiting portions 142 is increased to permit the extension 130 to pass the limiting portions 142 from therebetween. After the extension 130 further moves along the movement path P to reach the position as shown in FIG. 5C under driving of the pivoting cover 120, there is nothing to stop the cover 120 and thus the cover 120 can continue pivoting relative to the main body 110 to be fully opened (as shown in FIG. 2).

In other words, when the user wants to open the cover 120 of FIG. 1, the cover 120 is first stopped at the position as shown in FIG. 6 and subsequently the user exerts a small force on the cover 120 to cause the cover 120 to continue to pivot relative to the main body 110 to the position as shown in FIG. 2. Therefore, the time for fully opening the cover 120 can be extended, which provides a sufficient time for the optical disc 50 in the main body 110 to reduce the rotating speed. As such, the safety in using the optical disc drive 100 can be increased.

In the present embodiment, the elastic element 140 is, for example, a spring wire. However, the present invention is not intended to limit the elastic element to any particular embodiments described herein. In other embodiments not illustrated, the elastic element 140 may be a spring plate or another suitable element with elasticity. Besides, the extension 130 of the present embodiment is substantially a cylinder such that the extension 130 can easily pass the limiting portions 142 from therebetween. However, the present invention is not intended to limit the extension to any particular embodiments described herein and, therefore, the extension 130 may also be a structure of another suitable shape in other embodiments not illustrated.

Figure 7A:
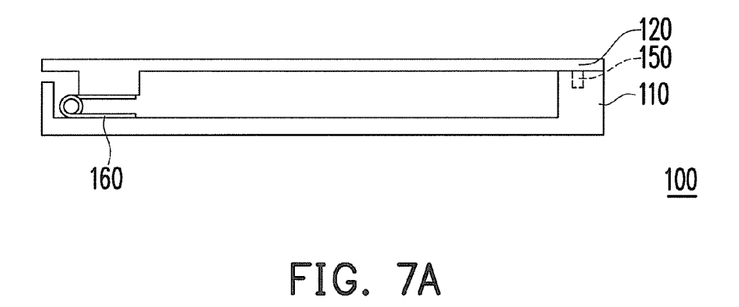
FIG. 7A is a partial side view of the optical disc drive of FIG. 1.
Figure 7B:
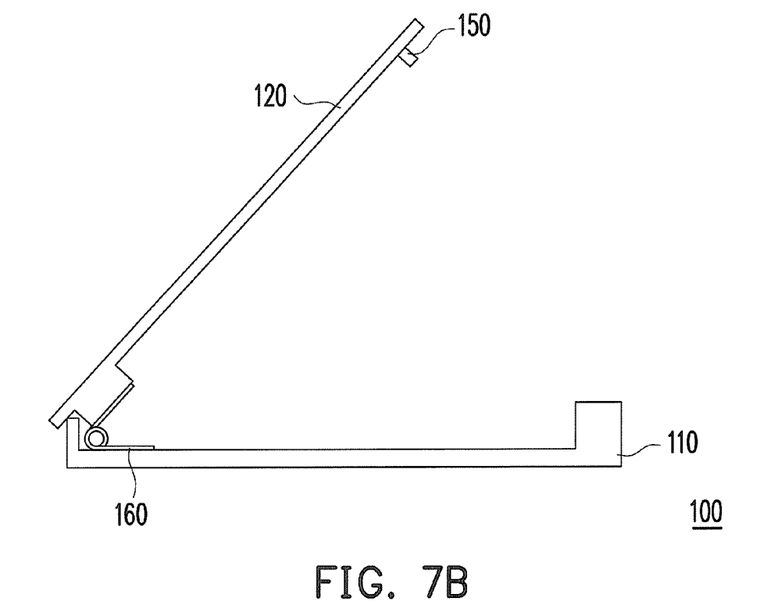
FIG. 7B is a partial side view of the optical disc drive of FIG. 7A with the cover being opened.

The way the cover 120 of FIG. 1 is driven to pivot relative to the main body 110 to be opened is described below with reference to FIGS. 7A and 7B. FIG. 7A is a partial side view of the optical disc drive of FIG. 1. FIG. 7B is a partial side view of the optical disc drive of FIG. 7A with the cover being opened. Referring to FIGS. 7A and 7B, in the present embodiment, the optical disc drive 100 further includes a locking member 150 and a torsion spring 160. The locking member 150 is connected to the cover 120. When the cover 120 is closed on the main body 110 (as shown in FIG. 7A), the cover 120 and the main body 110 are interlocked with each other via the locking member 150. The torsion spring 160 is connected between the cover 120 and the main body 110. Upon the interlocking between the cover 120 and the main body 110 being removed, the cover 120 pivots relative to the main body 110 to be opened away from the main body 110 (as shown in FIG. 7B) under the influence of the elastic force of the torsion spring 160.

It is noted that, during the pivoting of the cover 120 relative to the main body 110 under the influence of the elastic force of the torsion spring 160, the extension 130 is stopped by the limiting portions 142 (as shown in FIG. 5A) thus making the cover 120 stay at the position as shown in FIG. 6. At this time, the user exerts a force on the cover 120 to enable the extension 130 to push the limiting portions 142 apart and hence pass the limiting portions 142. As such, the cover 120 can continue to pivot relative to the main body 110 to the fully opened position as shown in FIG. 2 under the influence of the elastic force of the torsion spring 160.

In addition to two limiting portions 142, the elastic element 140 may also include more limiting portions such that the cover can be opened through more opening stages. A more detailed description regarding this is made below with reference to FIGS. 8A to 8F.

Figure 8A:
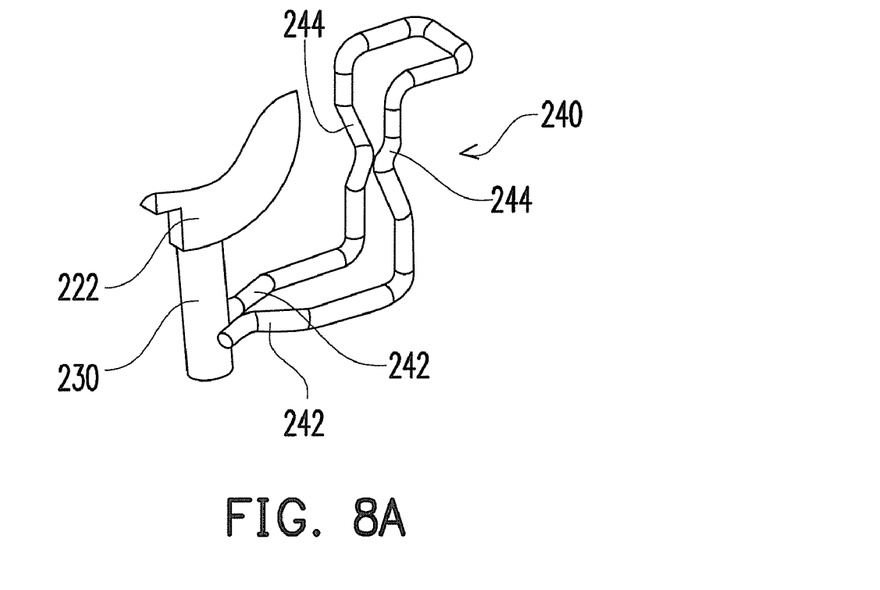
FIGS. 8A to 8F are operational views illustrating the movement of the extension along the movement path according to another embodiment of the present invention.
Figure 8B:
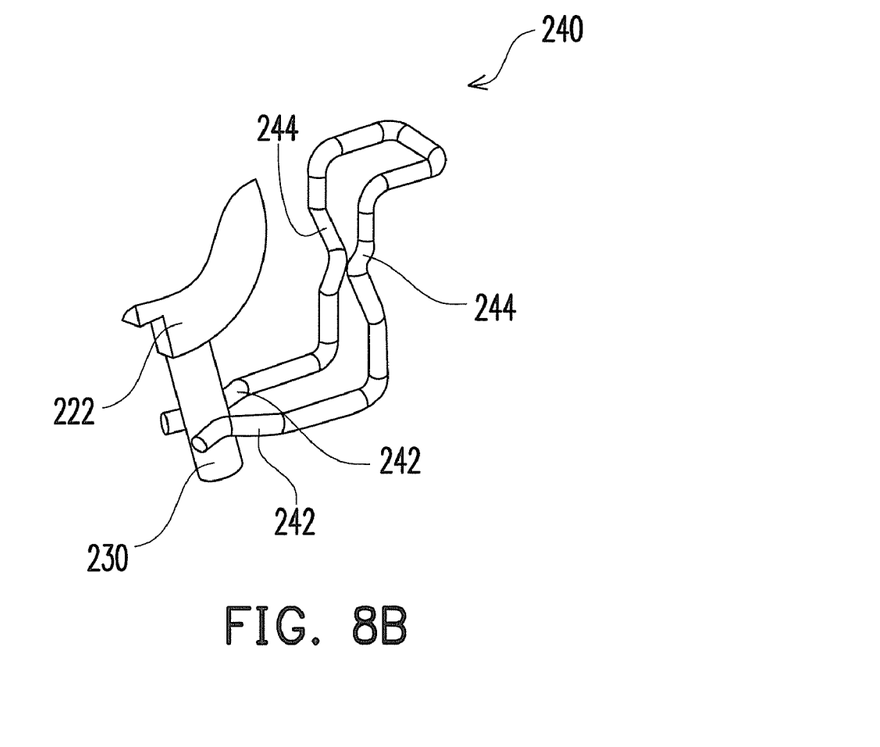

FIGS. 8A to 8F are operational views illustrating the movement of the extension along the movement path according to another embodiment of the present invention. It is noted that the cover and main body mentioned below are similar to the cover 120 and main body 110 of FIGS. 1, 2, and 6 and therefore are not shown again. Referring to FIG. 8A, in comparison with the elastic element 140 of FIG. 3 which has only two opposite limiting portions 142, the elastic element 240 of the present embodiment has two opposite limiting portions 242 and two opposite limiting portions 244. The extension 230 connected to the pivoting portion 222 can be driven by the pivoting cover (not shown) to the position as shown in FIG. 8A where the extension 230 contacts the two limiting portions 242. At this time, the extension 230 is stopped by the two limiting portions 242 from further movement. The user may exert force to drive the extension 230 of FIG. 8A to continue to move forward against the elastic force of the elastic element 240, thus pushing the two limiting portions 242 apart as shown in FIG. 8B. At this time, the distance between the two limiting portions 242 is increased to permit the extension to pass the two limiting portions 242 from therebetween.

Figure 8C:
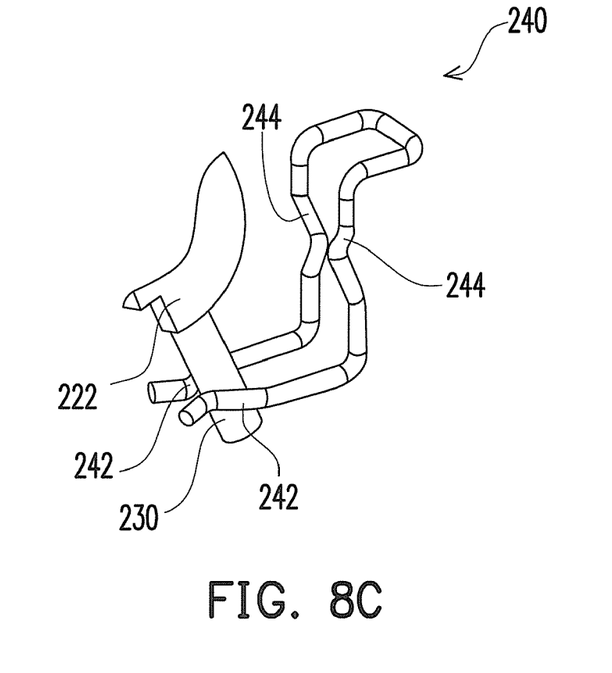
Figure 8D:
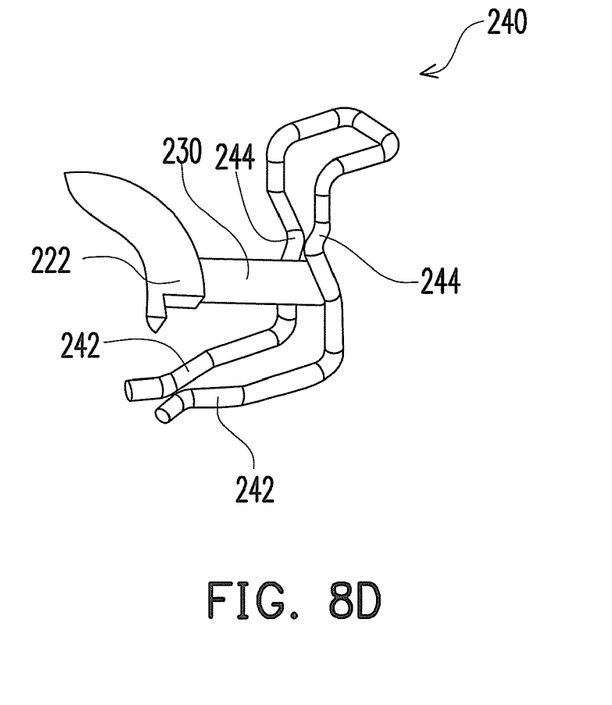
Figure 8E:
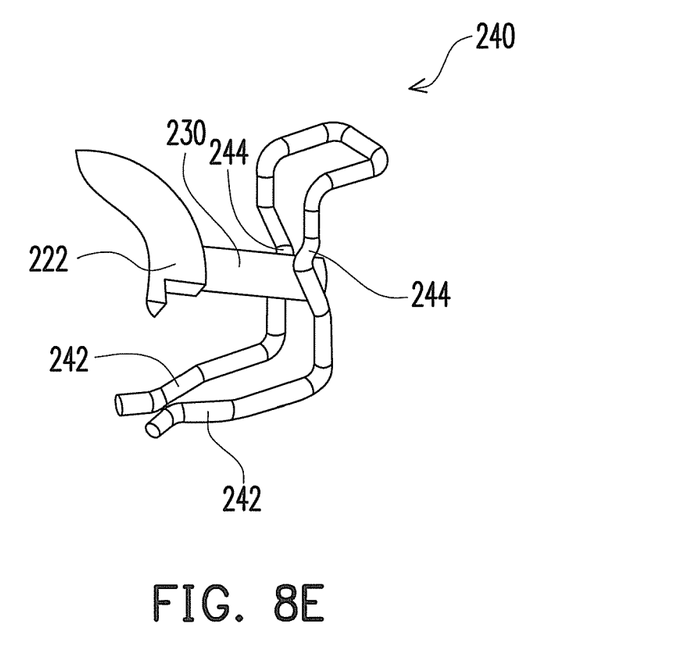
Figure 8F:
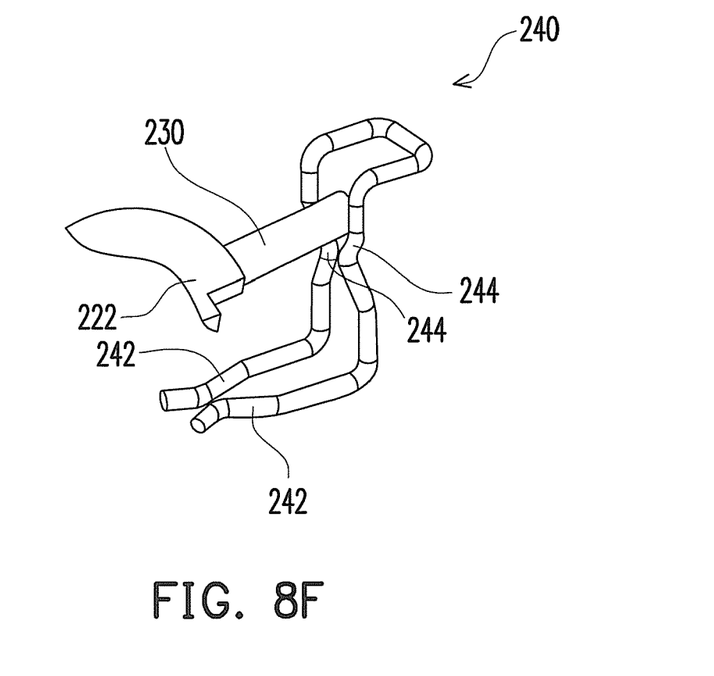

After the extension 230 continues to move to the position as shown in FIG. 8C, the extension 230 can continue moving to the position as shown in FIG. 8D with the pivoting of the cover and is then stopped by the two limiting portions 244. At this time, the user can exert force again to drive the extension 230 of FIG. 8D to continue to move forward against the elastic force of the elastic element 240, thus pushing the two limiting portions 244 apart as shown in FIG. 8E. At this time, the distance between the two limiting portions 244 is increased to permit the extension 230 to pass the two limiting portions 244 from therebetween. After the extension 230 continues to move to the position as shown in FIG. 8F, there is nothing to stop the cover (not shown) and therefore the cover can continue pivoting relative to the main body to be fully opened.

In other words, the elastic element 140 of FIGS. 3 and FIGS. 5A to 5C has only one pair of limiting portions 142 such that a two-stage opening of the cover can be achieved by the interference of the limiting portions 142 with the extension 130. The elastic element 240 of FIGS. 8A to 8F has two pairs of limiting portions 242 and 244 such that three-stage opening of the cover can be achieved by the sequential interference of the limiting portions 242 and 244 with the extension 230. In addition, the present invention is not intended to limit the number of limiting portions. Rather, in other embodiments not illustrated, more pairs of limiting portions may be used to achieve more-stage opening of the cover.

In summary, the elastic element of the present invention is fixed to the main body and the extension is connected to the cover. During pivoting of the cover relative to the main body toward the open position, the limiting portions of the elastic element interferences with the extension thus making the cover stay at a particular position. At this time, the user exerts a force to drive the extension to push the limiting portions apart against the elastic force of the elastic element, such that the cover can continue to pivot relative to the main body to be fully opened. In this way, the time for fully opening the cover can be extended, which provides a sufficient time for the optical disc in the main body to reduce the rotating speed. As such, the safety in using the optical disc drive can be increased. In addition, both the extension and elastic element are easy to fabricate and assemble, thus reducing fabrication cost and time. Furthermore, the elastic element can be configured to have multiple pairs of limiting portions to achieve three-stage or more-stage opening of the cover depending upon actual requirements.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An optical disc drive comprising:
   a main body for accommodating an optical disc;
   a cover comprising at least one pivoting portion and pivotably connected to the main body via the pivoting portion;
   an extension connected to the pivoting portion, the cover adapted for pivoting relative to the main body to drive the extension to move along a movement path; and
   an elastic element disposed on the main body and comprising two first limiting portions opposite to each other, the movement path extending through a gap between the two first limiting portions, a distance between the two first limiting portions being smaller than an outer diameter of the extension.

2. The optical disc drive according to claim 1, wherein the elastic element is a spring wire.

3. The optical disc drive according to claim 1, wherein the elastic element is a spring plate.

4. The optical disc drive according to claim 1, wherein the extension is substantially a cylinder.

5. The optical disc drive according to claim 1, wherein when the extension reaches a position between the two first limiting portions, the extension pushes the two first limiting portions apart against the elastic force of the elastic element to pass the two first limiting portions from therebetween.

6. The optical disc drive according to claim 1, wherein the elastic element further comprises two second limiting portions opposite to each other, the movement path extends through a gap between the two second limiting portions, and a distance between the two second limiting portions is smaller than the outer diameter of the extension.

7. The optical disc drive according to claim 6, wherein when the extension reaches a position between the two second limiting portions, the extension pushes the two second limiting portions apart against the elastic force of the elastic element to pass the two second limiting portions from therebetween.

8. The optical disc drive according to claim 1, further comprising:
   a locking member connected to the cover, wherein the cover and the main body are interlocked with each other via the locking member when the cover is closed on the main body; and
   a torsion spring connected between the cover and the main body, wherein the cover pivots relative to the main body away from the main body under the influence of the elastic force of the torsion spring when the interlocking between the cover and main body is removed.

* * * * *